2,840,567
Patented June 24, 1958

2,840,567
1-(p-AMINOPHENYL)-3-AMINOPYRAZOLINES AND PROCESS

Rudolf Mersch, Leverkusen-Bayerwerk, and Detlef Delfs, Opladen, Germany, assignors to Farbenfabriken Bayer Aktiengesellschaft, Leverkusen, Germany, a corporation of Germany No Drawing. Application June 14, 1955
Serial No. 515,558

Claims priority, application Germany June 14, 1954

9 Claims. (Cl. 260—310)

This invention relates to novel 1-(p-aminophenyl)-3-aminopyrazolines and to a process for their production.

It is known that 1-(p-acylaminophenyl)-3-aminopyrazolines (respectively in the tautomeric form 1-(p-acylaminophenyl)-3-imino-pyrazolidones) can be obtained by various methods. It is further known that if these compounds are treated with mineral or organic acids only the 1-(p-acylaminophenyl)-3-oxypyrazolines are obtained (British Patent No. 679,678), but not the 1-(p-aminophenyl)-3-aminopyrazolines.

It is an object of the present invention to provide a process for the production of novel 1-(p-aminophenyl)-3-aminopyrazolines respectively 1-(p-aminophenyl)-3-iminopyrazolidones from 1-(p-acylaminophenyl)-3-aminopyrazolines. Further objects will appear hereinafter.

These objects are attained in accordance with the present invention by alkaline saponification of 1-(p-acylaminophenyl)-3-aminopyrazolines.

The 1-(p-acylaminophenyl)-3-aminopyrazolines can be obtained by using the methods described in British Patent No. 679,678 and in the co-pending application Serial No. 440,562, filed June 30, 1954, now abandoned. According to the co-pending application, these compounds are obtained by reducing a β-[N-(p-acylaminophenyl)-N-nitroso-]-aminopropionitrile, wherein the phenyl nucleus can be substituted by halogen or alkyl, alkoxyl, hydroxyamino, acylamino, carboxyl or sulfonic acid groups and wherein the amino group of the p-aminophenyl radical can be mono-substituted by an alkyl radical, at a pH ranging from 1 to 7.

Suitable compounds which can be used as starting materials are, for example, 1-(p-aceto-methylaminophenyl)-3-aminopyrazoline, 1-(p-aceto-aminophenyl)-3-aminopyrazoline and 1-(p-aceto-amino-m-chlorophenyl)-3-aminopyrazoline.

The saponification can be carried out with aqueous or concentrated alkali metal hydroxide solution or soda solution preferably at elevated temperature.

The 1-(p-aminophenyl)-3-amino-pyrazolines tend to decompose in the air. Therefore, preferably they are stored in form of their stable salts, for example the dihydrochloride.

It was very surprising that the amino respectively imino group in the 3-position of the pyrazoline ring of 1-(p-acylaminophenyl)-3-aminopyrazolines respectively 1 - (p - acylaminophenyl) - 3 - iminopyrazolidones exhibits such a stability against the action of aqueous alkali; while the reaction with aqueous acids results in a hydrolyzation of the above mentioned amino respectively imino group.

The 1-(p-aminophenyl)-3-aminopyrazolines obtainable by the process of the invention are useful photographic developing agents.

The present invention is further illustrated by the following examples without, in any way, limiting it.

Example 1

23.2 grams of 1-(p-aceto-methylaminophenyl)-3-aminopyrazoline (M. P. 263° C.) are refluxed in 230 milliliters of 1-normal sulfuric acid for 4 hours. Upon cooling, the 1-(p-aceto-methylaminophenyl)-3-oxypyrazoline crystallizes in good yield from the acid solution. M. P. 198° C.

Example 2

23.2 grams of 1-(p-aceto-methylaminophenyl)-3-aminopyrazoline (M. P. 263° C.) are refluxed in 270 milliliters of a 10% sodium hydroxide solution for 10 hours. Thereby, the 1-(p-methylaminophenyl)-3-aminopyrazoline formed partly dissolves in the solution while another part remains undissolved as oil. Upon cooling, the 1-(p-methylaminophenyl)-3-aminopyrazoline crystallizes and is filtered off. From the aqueous alkaline mother liquor a further amount of the compound can be obtained upon evaporation. Yield 17.5 grams (92% of the theoretical) of colorless crystals which easily decompose in the air. M. P. 122° C. under decomposition.

The 1-(p-methylaminophenyl)-3-aminopyrazoline dihydrochloride can be obtained by dissolving one part of 1-(methylaminophenyl)-3-aminopyrazoline in 7 parts by weight of methanol and adding 4 parts by weight of a 38% hydrochloric acid solution. The dihydrochloride formed crystallizes in good yield.

Example 3

21.8 grams of 1-(p-aceto-aminophenyl)-3-aminopyrazoline (M. P. 204° C.) are refluxed with 220 milliliters of a 5% solution of sodium hydroxide. The 1-(p-aminophenyl)-3-aminopyrazoline formed dissolves in the solution and can be obtained upon cooling in crystals with good yield. M. P. about 175° C. under decomposition.

The 1-(p-aminophenyl)-3-aminopyrazoline dihydrochloride can be obtained by following the procedure of Example 2.

Example 4

20.4 grams of 1-(p-formylaminophenyl)-3-aminopyrazoline (M. P. 168° C.) are refluxed with 200 milliliters of a 10% soda solution for 6 hours. Upon cooling, the 1-(p-aminophenyl)-3-aminopyrazoline formed crystallizes. The product obtained is identical with the one obtained in Example 3.

Example 5

23.2 grams of 1-(4'-acetylamino-3'-methylphenyl)-3-aminopyrazoline (M. P. 237° C.) are refluxed with 230 milliliters of a 10% sodium hydroxide solution for 12 hours. Upon cooling, the 1-(4'-amino-3'-methylphenyl)-3-aminopyrazoline formed is obtained in good yield. M. P. about 166° C. under decomposition.

Example 6

24.8 grams of 1-(4'-acetylamino-3'-methoxyphenyl)-3-aminopyrazoline (M. P. 194° C.) are refluxed with 180 milliliters of a 10% solution of sodium hydroxide in the presence of 2 grams of sodium hydrosulfite and in a nitrogen atmosphere for 6 hours. The 1-(4'-amino-3'-methoxyphenyl)-3-aminopyrazoline formed is obtained upon cooling in good yield. M. P. about 136° C. under decomposition.

Example 7

25.3 grams of 1-(4'-aceto-amino-3'-chlorophenyl)-3-aminopyrazoline (M. P. 209° C.) are refluxed with 250 milliliters of a 10% sodium hydroxide solution in the presence of 2 grams of sodium hydrosulfite in a nitrogen atmosphere for 12 hours. The 1-(4'-amino-3'-chlorophenyl)-3-aminopyrazoline formed crystallizes upon cooling. M. P. about 189° C. under decomposition.

Example 8

23.2 grams of 1-(4'-aceto-ethylaminophenyl)-3-aminopyrazoline (M. P. 202° C.) are refluxed with 250 milliliters of a 10% sodium hydroxide solution by following the procedure of Example 7. The 1-(4'-ethylamino)-3-aminopyrazoline formed is obtained in good yield. M. P. about 104° C. under decomposition.

Example 9

23.2 grams of 1-(4'-aceto-amino-2'-methylphenyl)-3-aminopyrazoline (M. P. 180° C.) are refluxed with 250 milliliters of a 10% sodium hydroxide solution in a nitrogen atmosphere for 5 hours. Upon cooling, the 1-(4' - amino - 2' - methylphenyl) - 3 - aminopyrazoline crystallizes in good yield. M. P. about 115° C. under decomposition.

We claim:

1. As a new chemical compound, a member selected from the group consisting of the free bases and their salts of compounds having the tautomeric general formulae

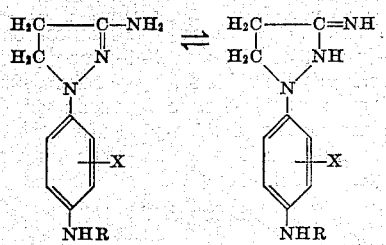

wherein R represents a member selected from the group consisting of hydrogen and alkyl, and X is a member selected from the group consisting of hydrogen, alkyl, alkoxyl, and halogen.

2. As novel compound the compound represented by the tautomeric formulae

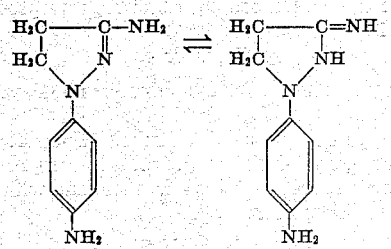

3. As novel compound the compound represented by the tautomeric formulae

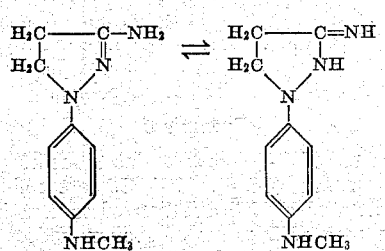

4. As novel compound the compound represented by the tautomeric formulae

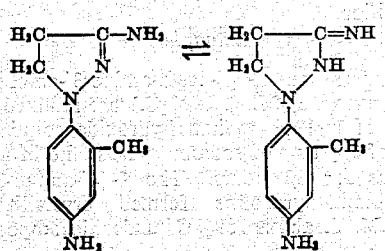

5. As a new chemical compound, the dihydrochloride of the compound represented by the tautomeric formulae

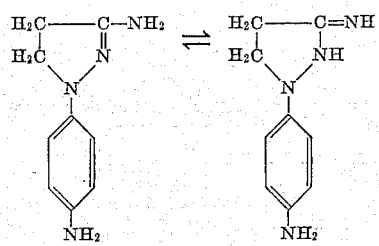

6. As a new chemical compound the dihydrochloride of the compound represented by the tautomeric formulae

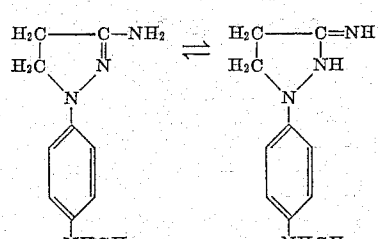

7. A process for the production of organic compounds represented by the tautomeric general formulae

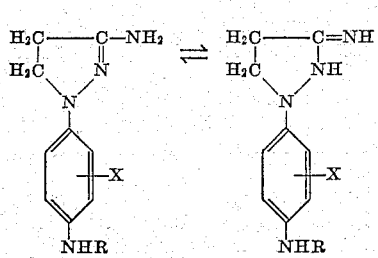

wherein R represents a member selected from the group consisting of hydrogen and alkyl and X represents a member selected from the group consisting of hydrogen, alkyl, alkoxyl, and halogen, which comprises subjecting to an alkaline saponification a compound represented by the tautomeric formulae

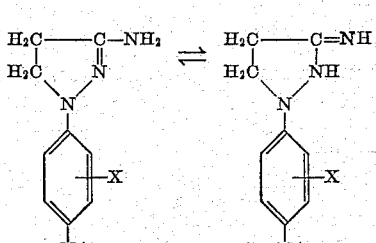

wherein Ac represents an acyl radical and R and X represent radicals as defined above, and recovering the compound formed.

8. A process for the production of a compound represented by the tautomeric formulae

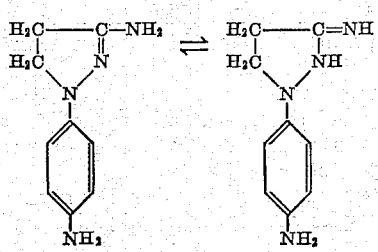

which comprises subjecting to an alkaline saponification a compound represented by the tautomeric formulae

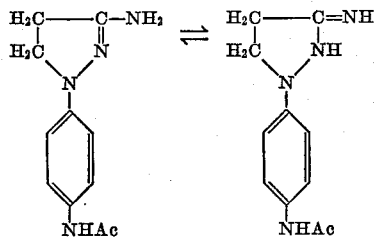

wherein Ac represents an acyl radical, and recovering the compound formed.

9. A process for the production of a compound represented by the tautomeric formulae

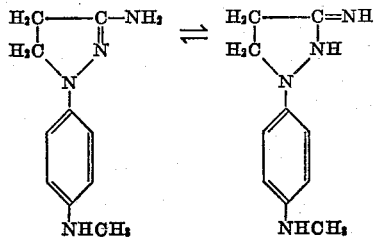

which comprises subjecting to an alkaline saponification a compound represented by the tautomeric formulae

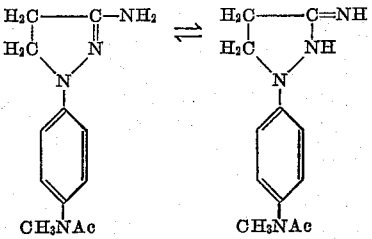

wherein Ac represents an acyl radical, and recovering the compound formed.

References Cited in the file of this patent
UNITED STATES PATENTS
2,726,248 Kendall et al. _____ May 17, 1954
FOREIGN PATENTS
679,678 Great Britain _____ Sept. 24, 1952
OTHER REFERENCES
Karrer: "Org. Chem." (Elsevier, 2nd Eng. Ed.), p. 452 (1946).